United States Patent Office 2,983,753
Patented May 9, 1961

---

2,983,753
PROCESS OF PREPARING 5β-HYDROXY-8-OXO-1,4,4aα,5,8,8aα - HEXAHYDRONAPHTHALENE-1β-CARBOXYLIC ACID

Julien Warnant, Neuilly, and Jacques Prost-Marechal, Paris, France, assignors to Les Laboratoires Francais de Chimiotherapie, Paris, France, a corporation of France No Drawing. Filed June 16, 1958, Ser. No. 742,046

Claims priority, application France June 17, 1957

2 Claims. (Cl. 260—514)

The present invention relates to an improved process of preparing 5β-hydroxy-8-oxo-,1,4,4aα,5,8,8aα-hexahydronaphthalene-1β-carboxylic acid which represents a valuable intermediate in the synthesis of reserpine.

Heretofore, said polyhydronaphthalene carboxylic acid has been prepared by selective reduction of the corresponding 5,8-dioxo compound which is obtained by condensation of p-benzoquinone with vinyl acrylic acid. As 5β - hydroxy - 8 - oxo-1,4,4aα,5,8,8aα-hexahydronaphthalene-1β-carboxylic acid is used as starting material in the process of preparing reserpine according to Woodward et al., J. Am. Chem. Soc., vol. 78, page 2023 (1956) and according to copending, commonly-assigned patent application Serial No. 693,028, filed on October 29, 1957, it is desirable to provide a process which permits the production of said acid in a high yield and as economically as possible by using a readily available and inexpensive reducing agent. It is well understood that any increase in yield and any reduction of the cost in the early stages of the reserpine synthesis will have a very pronounced effect upon the total yield and costs of such a process. As is well known, reserpine is an alkaloid compound which is of considerable importance in the therapeutical field for the treatment of hypertension and certain mental diseases.

It is one object of the present invention to provide an improved simple and effective process of preparing said 5β - hydroxy - 8 - oxo - 1,4,4aα,5,8,8aα - hexahydronaphthalene-1β-carboxylic acid compound.

Other objects of the present invention and advantageous features thereof will become apparent as the description proceeds.

In principle, 5β-hydroxy-8-oxo-1,4,4aα,5,8,8aα-hexahydronaphthalene-1β-carboxylic acid of Formula I

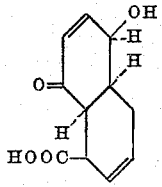

I is prepared according to the present invention by subjecting 5,8 - dioxo - 1,4,4aα,5,8,8aα - hexahydronaphthalene-1β-carboxylic acid of Formula II

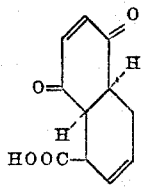

II under specific reduction conditions to the action of a reducing agent such as sodium boron hydride in a medium having a pH-value between 6.0 and 7.0. Said pH-value is achieved by the addition of a buffering agent such as sodium carbonate, sodium bicarbonate, sodium phosphate, sodium borate, or the corresponding potassium salts, or an organic base such as triethylamine, diethylamine and pyridine. According to the present invention the amount of sodium boron hydride used as preferred reducing agent is considerably smaller than the amount employed in the prior art process. Reduction is carried out in an aqueous solution at a low temperature, preferably at a temperature between about —5° C. and about +10° C. and in a nitrogen atmosphere. When operating in the presence of sodium borate or potassium carbonate as buffering agent the final product is readily obtained in a yield of 90% of the theoretical amount. Use of sodium or potassium bicarbonate produces an even higher yield of 94%. In the methods of preparing the desired polyhydronaphthalene carboxylic acid compound, as they were used heretofore, reduction of 5,8-dioxo-1,4,4aα,5,8,8aα - hexahydronaphthalene - 1β - carboxylic acid with sodium boron hydride produces the desired final product in a yield which is lower than 70%, and even then it is necessary to employ the sodium boron hydride in an amount three times as high as that required when proceeding according to the present invention.

The following examples serve to illustrate the present invention without, however, limiting the same thereto. More particularly, reduction may be carried out in aqueous organic solvents such as tetrahydrofuran or methanol when the buffering agent is an organic base, for instance, triethylamine. In place of an alkali metal boron hydride, an alkaline earth metal boron hydride may also be used. The reaction temperature and the amount and nature of the reducing agent may also be varied in accordance with the principles set forth herein and in the claims annexed thereto.

*Preparation of racemic 5β-hydroxy-8-oxo-1,4,4aα,5,8,8aα-hexahydronaphthalene-1β-carboxylic acid (Formula I)*

EXAMPLE 1

1 kg. of 5,8-dioxo-1,4,4aα,5,8,8aα-hexahydronaphthalene-1β-carboxylic acid is suspended in 5 l. of water with mechanical stirring while passing nitrogen therethrough. While stirring is continued and after cooling to +2° C., 440 g. of sodium borate are added. The resulting mixture has a pH-value between 6.6 and 6.8.

A solution of sodium boron hydride is prepared by adding 75 g. of sodium boron hydride to a mixture of 300 cc. of water and 3 cc. of a 30% sodium hydroxide solution (36° Bé). 190 cc. of said solution are added in small portions to the mixture containing said starting dioxo compound while maintaining the temperature below 7° C. After addition is completed the mixture is stirred several minutes and cooled to +2° C. Further 220 g. of sodium borate are added at once. Thereby, the pH-value of the reaction mixture is again adjusted to a pH of 6.6 to 6.8. The mixture is cooled to +2° C. and 120 cc. of the sodium boron hydride solution described hereinabove are added. The desired carboxylic acid compound of Formula I, which is formed thereby remains in solution. Charcoal is added for decolorization. The solution is filtered. The charcoal is washed with water. During these operations, the temperature is maintained below 5° C. The wash waters are combined with the filtrate. The combined solutions are acidified to the end point of Congo red paper by the addition of 3 N sulfuric acid, while neither stirring nor introduction of nitrogen is discontinued. Thereby, the desired carboxylic acid compound of Formula I precipitates. Stirring and cooling below 7° C. is continued for 1 hour. The precipitate is filtered off with suction and washed thoroughly with water. Adhering water is separated by efficient suction. The resulting compound is suspended in 4 l. of icewater and the suspension is stirred for 1 hour, filtered with suction, washed with water, filtered and dried. 900–910 g. (90% of the theoretical amount) of 5β-hydroxy-8-oxo-1,4,4aα,5,8,8aα-hexahydronaphthalene-1β-carboxylic acid are obtained. The compound melts at 185–186° C. It can directly be resolved and used in the process of preparing reserpine without further purification.

EXAMPLE 2

The preparation of 5β-hydroxy-8-oxo-1,4,4aα-5,8,8aα-hexahydronaphthalene-1β-carboxylic acid is carried out as described in Example 1. However, in place of sodium borate, potassium carbonate is used as buffering agent. 210 g. of potassium carbonate are dissolved in 210 cc. of water and the solution is added to the reaction mixture. The yield is the same as obtained in Example 1.

EXAMPLE 3

The procedure is the same as described in Example 1. However, in place of sodium borate, 30 g. of sodium bicarbonate in solid pulverized form are added to the reaction mixture to act as buffering agent. The yield of the acid of Formula I is 941 g.

EXAMPLE 4

The procedure is the same as described in Example 1. However, in place of sodium borate, 35.5 g. of potassium bicarbonate in solid pulverized form are added to the reaction mixture. The yield of the acid of Formula I is 942 g.

EXAMPLE 5

50 g. of 5,8-dioxo-1,4,4aα,5,8,8aα-hexahydronaphthalene-1β-carboxylic acid are added to 150 cc. of methanol with stirring and while passing nitrogen therethrough. The mixture is cooled from the outside. While maintaining the temperature between 0° and —5° C., a solution of 20 g. of triethylamine in 100 cc. of methanol is added drop by drop. Thereafter, 4.5 g. of 95% potassium boron hydride are added in small portions within about 25 minutes. During the addition of the reagents, the temperature is not allowed to rise above 0° C. Stirring is continued at the same temperature for half an hour. The pH-value of the mixture is adjusted to a pH of 5.0 to 6.0 by the addition of 5 N hydrochloric acid. The reaction mixture is then poured into a mixture of 125 cc. of water and 125 cc. of ice. Cooling from the outside is discontinued. Methanol is distilled off in a vacuum on a water bath. The reaction mixture is stirred with charcoal and filtered. The charcoal is washed with water. After combining the wash waters and the filtrate, about 25 cc. of hydrochloric acid are added, thereby adjusting the pH-value of the mixture to a pH of 1.0 to 2.0 and precipitating the desired carboxylic acid compound. The precipitate is washed with a saturated sodium chloride solution and with ice water. After drying, 48 g. of the acid of Formula I are obtained.

We claim:

1. In a process of preparing 5β-hydroxy-8-oxo-1,4,4aα,5,8,8aα-hexahydronaphthalene - 1β - carboxylic acid, the steps comprising subjecting a suspension of 5,8-dioxo-1,4,4aα,5,8,8aα-hexahydronaphthalene-1β - carboxylic acid in a medium selected from the group consisting of water, aqueous methanol and aqueous tetrahydrofuran to the action of a reducing agent selected from the group consisting of sodium boron hydride, potassium boron hydride, and an alkaline earth metal boron hydride, in the presence of a buffering agent selected from the group consisting of an alkali metal carbonate, an alkali metal bicarbonate, an alkali metal phosphate, an alkali metal borate, and an organic base, said buffering agent being added in an amount sufficient to maintain the pH-value during reduction at a pH between about 6.0 and about 7.0, while maintaining a temperature between —5° C. and +10° C. and passing nitrogen therethrough, acidifying the reaction mixture to precipitate the resulting 5β-hydroxy-8-oxo - 1,4,4aα,5,8,8aα - hexahydronaphthalene-1β-carboxylic acid, and washing the filtered acid with water.

2. The process according to claim 1, wherein the reducing agent and the buffering agent are added in portions.

References Cited in the file of this patent

UNITED STATES PATENTS 2,883,384    Woodward           Apr. 21, 1959

OTHER REFERENCES

Woodward et al.: "Jour. Amer. Chem. Soc.," vol. 78 (1956), pages 2023–2025.